(12) United States Patent
Fujii

(10) Patent No.: US 7,890,607 B2
(45) Date of Patent: Feb. 15, 2011

(54) EXECUTION APPARATUS FOR EXECUTING A FUNCTION IN RESPONSE TO A REQUEST RECEIVED VIA A NETWORK, AND METHOD OF ACCEPTING A REQUEST RECEIVED VIA A NETWORK

(75) Inventor: Kenichi Fujii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 294 days.

(21) Appl. No.: 12/022,455

(22) Filed: Jan. 30, 2008

(65) Prior Publication Data

US 2008/0189396 A1 Aug. 7, 2008

(30) Foreign Application Priority Data

Feb. 1, 2007 (JP) ............................. 2007-023255

(51) Int. Cl.
*G06F 15/16* (2006.01)
(52) U.S. Cl. ................... 709/219; 709/223; 719/331; 700/19; 358/1.15
(58) Field of Classification Search ................ 709/219, 709/223; 719/331; 700/19; 358/1.15
See application file for complete search history.

(56) References Cited

U.S. PATENT DOCUMENTS

| | | | |
|---|---|---|---|
| 2005/0015433 A1* | 1/2005 | Nakamura | 709/201 |
| 2006/0282532 A1 | 12/2006 | Fujii | 709/224 |
| 2007/0032888 A1* | 2/2007 | Hirata et al. | 700/19 |
| 2007/0067430 A1 | 3/2007 | Hirata | 709/223 |
| 2007/0201696 A1 | 8/2007 | Hirata et al. | 380/243 |
| 2007/0206222 A1* | 9/2007 | Shitano et al. | 358/1.15 |
| 2008/0005752 A1* | 1/2008 | Morris | 719/331 |

FOREIGN PATENT DOCUMENTS

| | | |
|---|---|---|
| JP | 07-121358 | 5/1995 |
| JP | 09-138760 | 5/1997 |
| JP | 2003-162533 | 6/2003 |

* cited by examiner

*Primary Examiner*—Tammy T Nguyen
(74) *Attorney, Agent, or Firm*—Fitzpatrick, Cella, Harper & Scinto

(57) ABSTRACT

An execution apparatus for executing a function in response to a request received via a network obtains interface information representing an interface via which a component that provides a function accepts a request, and generates an interface for allowing the execution apparatus to accept a request via a network, based upon the obtained interface information of the component that accepts the request received via the network.

14 Claims, 9 Drawing Sheets

EXECUTION APPARATUS FOR EXECUTING A FUNCTION IN RESPONSE TO A REQUEST RECEIVED VIA A NETWORK, AND METHOD OF ACCEPTING A REQUEST RECEIVED VIA A NETWORK

BACKGROUND OF THE INVENTION

1. Field of the Invention

The present invention relates to an execution apparatus for executing a function in response to a request received via a network, and to a method of accepting a request received via a network.

2. Description of the Related Art

Office equipment and equipment for domestic use now come equipped with a function for implementing linkage with processing provided via a network.

A technique available for implementing such linkage with processing provided via a network is UPnP (Universal Plug and Play). UPnP is a technique for exchanging interface information of a device and for calling a function. Other techniques having a similar purpose and function are Jini and Nxta, etc.

With UPnP, interface information has been standardized in relation to several device types. Therefore, in a case where the function of a particular type device can be checked in advance, it is possible to adopt a configuration that pre-installs processing corresponding to the interface information. However, in a case where a standardized specification is expanded on one's own in order to maximize a device-specific function or a case where a standard specification itself has been expanded after device development, the handling of interface information relating to the expanded portion cannot be decided beforehand.

UPnP described above mainly targets a home network consisting of domestic equipment. However, Web service is available as a similar technique in business networks consisting of office equipment.

Web service is a versatile technique capable of supporting a variety of scales and types from large-scale systems that take charge of commercial transactions between enterprises to stand-alone items of office equipment. For this reason, it is predicted that a style in which a plurality of Web services are connected together to construct business solutions or applications will become the mainstream in next-generation software development.

In a Web service, interface information is defined by WSDL (Web Service Description Language). There are many cases where interface information using WSDL includes content that is more complicated in comparison with UPnP. For example, use can be made of a data structure defined by the developer on his own. Furthermore, with Web service, information based upon a plurality of items of message schema information can be mixed with a single SOAP (Simple Object Access Protocol) message. "Message schema information" is information that indicates message structure and method of description.

Thus, with Web service, there is a high degree of freedom in message schema information, which is interface information of the service. A device for processing this therefore requires XML (Extensible Markup Language), which is more sophisticated than UPnP, and messaging processing.

Although standard interface information has been defined in accordance with device type in UPnP, standardization relating to the content of interface information per se has not been performed in Web Service.

Furthermore, it is highly likely that the growth and expansion of business solutions of interest will be accompanied by time-to-time changes in the interface information required.

In devices that support Web service, adaptive execution of required software is sought even in circumstances where interface information changes arbitrarily. This is especially conspicuous in case of devices in which the goal is to support business solutions.

If the relationship between message schema information for using a device function and software internally of the device for interpreting and processing this information is fixed (static), the following problem arises: In an environment in which information based upon a plurality of items of message schema information is mixed with a single SOAP message, as in Web service, there is a possibility that not all of the content of received messages can be processed.

In order to deal with such circumstances, the following technique of automatically selecting adoption or rejection of software stored in a device is available:

Specifically, the technique is one used in order to perform management of a software module in which ordinary operating-system software or a part of application software is implemented. This technique is referred to as a "dynamic load library" technique. The dynamic load library technique is a technique that makes it possible to load or unload a plurality of items of library software having different functions dynamically in accordance with the application software. As long as a function provided by library software is unnecessary, the library software is not read in and executed. Further, in many computer environments, a memory image can be shared after the library software has been read in.

With this technique alone, however, a decision as to which library is necessary must be made by the application software. Accordingly, in a case where a plurality of items of message schema information and a plurality of message processing programs are interconnected, all must be decided by each individual application.

Furthermore, there is a technique whereby a program is stored, managed and executed as component software. This technique is referred to as "component container" technique. This technique is an evolution of the dynamic load library. The overall system is composed of component software for implementing individual functions and container software that is capable of storing and executing a plurality of items of the component software. A request from a user is received by the container software and the appropriate component software starts being executed depending upon the decision made by the container software. In accordance with this technique, the component software need not start execution if there is no request from a user, and it is also possible to halt the system in a case where there is no request. As a result, adaptive selection and execution of software is possible.

However, as with the dynamic load library technique, this technique merely provides an environment usable in dynamic selection of software, and this alone does not make it possible to implement automatic processing of a message processing program made to conform to message schema information.

Although these techniques are useful as fundamental processing techniques for implementing dynamic selection of adoption or rejection of software, automatic processing of a message processing program made to conform to message schema information cannot be implemented solely by these stand-alone techniques. In addition, interface information in the local device itself cannot be updated.

Furthermore, the following techniques are described in patent documents.

First, a technique described in Japanese Patent Application Laid-Open No. 2003-162533 provides a schema unification conversion system in which schemas can be unified even without a database used for the same application. With the schema unification conversion system, a plurality of different data schemas are generated beforehand from data referred to as an "abstract schema graph", thereby achieving unification.

However, with the approach using an abstract schema set forth in Japanese Patent Application Laid-Open No. 2003-162533, the degree of freedom of message schema information is high in message exchange in a device that uses Web Service, as mentioned above, and there is no assurance that the message schema information handled can be restored to an abstract schema.

Next, a technique described in Japanese Patent Application Laid-Open No. 7-121358 makes it possible to automatically reflect a result in creation of specifications conforming to a program specialization request and in the program creation operation when the specifications of a program are created. According to this technique, a program specializing apparatus specializes program prototype information and generates program specifications based upon program prototype information and data definition assignment information with respect to external data. The purpose is to rapidly develop a program corresponding to a data definition at the time of program development.

With the technique described in Japanese Patent Application Laid-Open No. 7-121358, however, a program cannot be changed over using a data definition as the key at the time of program execution. That is, dynamic automatic processing of a message processing program made to conform to message schema information at the time of execution cannot be implemented.

Furthermore, a technique described in Japanese Patent Application Laid-Open No. 9-138760 has as its object to implement a mechanism for calling a suitable message handler by managing entry of a message handler dynamically at the time of execution. By attaching a unique identifier worldwide to an operation or data in an exchanged message, an appropriate message handler is searched for and, if one exists, this handler is selected. If one does not exist, then an appropriate program module is loaded/linked, a message handler in the module is selected and the selected handler is called.

According to the technique described in Japanese Patent Application Laid-Open No. 9-138760, however, the instance of a message is furnished with an ID that is capable of specifying a program that processes this, and therefore ID assignment must be handled as an item of understanding between the sending and receiving sides of the message. In message exchange in a device using Web service, it cannot be expected that such an ID will always be assigned in the message schema information handled. Further, since schema processing is not applied to a message sent and received, interface information in the local device cannot be updated.

Thus, the prior art provides some solutions to the problems of processing efficiency relating to software and versatile handling of message schema. However, in circumstances where interface information is changed, as in Web service in a case where a business solution is supported, the prior art does not provide a satisfactory solution to the problem of adaptive execution of necessary software.

SUMMARY OF THE INVENTION

An object of the present invention is to so arrange it that component software relating to a function provided by a device can be executed adaptively even in circumstances where interface information of a device or component software is changed.

Another object of the present invention is to provide an execution apparatus for executing a function in response to a request received via a network, the apparatus having: an obtaining unit adapted to obtain interface information representing an interface for allowing a component that provides a function to accept a request, and a generation unit adapted to generate an interface for allowing the execution apparatus to accept a request via a network, based upon the interface information of the component that accepts the request received via the network, the interface information being obtained by the obtaining unit.

A further object of the present invention is to provide a method of accepting a request received via a network, comprises: obtaining interface information representing an interface for allowing a component that provides a function to accept a request, and generating an interface for allowing an execution apparatus to accept a request via a network, based upon the obtained interface information of the component that accepts the request received via the network.

According to one aspect of the present invention, there is provided an execution apparatus for executing a function in response to a request received via a network, the apparatus comprises:

an obtaining unit adapted to obtain interface information representing an interface via which a component that provides a function accepts a request; and a generation unit adapted to generate an interface via which the execution apparatus accepts a request via a network, based upon the interface information of the component that accepts the request received via the network, the interface information being obtained by the obtaining unit.

According to another aspect of the present invention, there is provided a method of accepting a request received via a network, comprises steps of:

obtaining interface information representing an interface via which a component that provides a function accepts a request; and generating an interface via which an execution apparatus accepts a request via a network, based upon the obtained interface information of the component that accepts the request received via the network.

Further features of the present invention will become apparent from the following description of exemplary embodiments with reference to the attached drawings.

DESCRIPTION OF THE EMBODIMENTS

A preferred embodiment of the present invention will now be described based upon the drawings.

Figure 1:
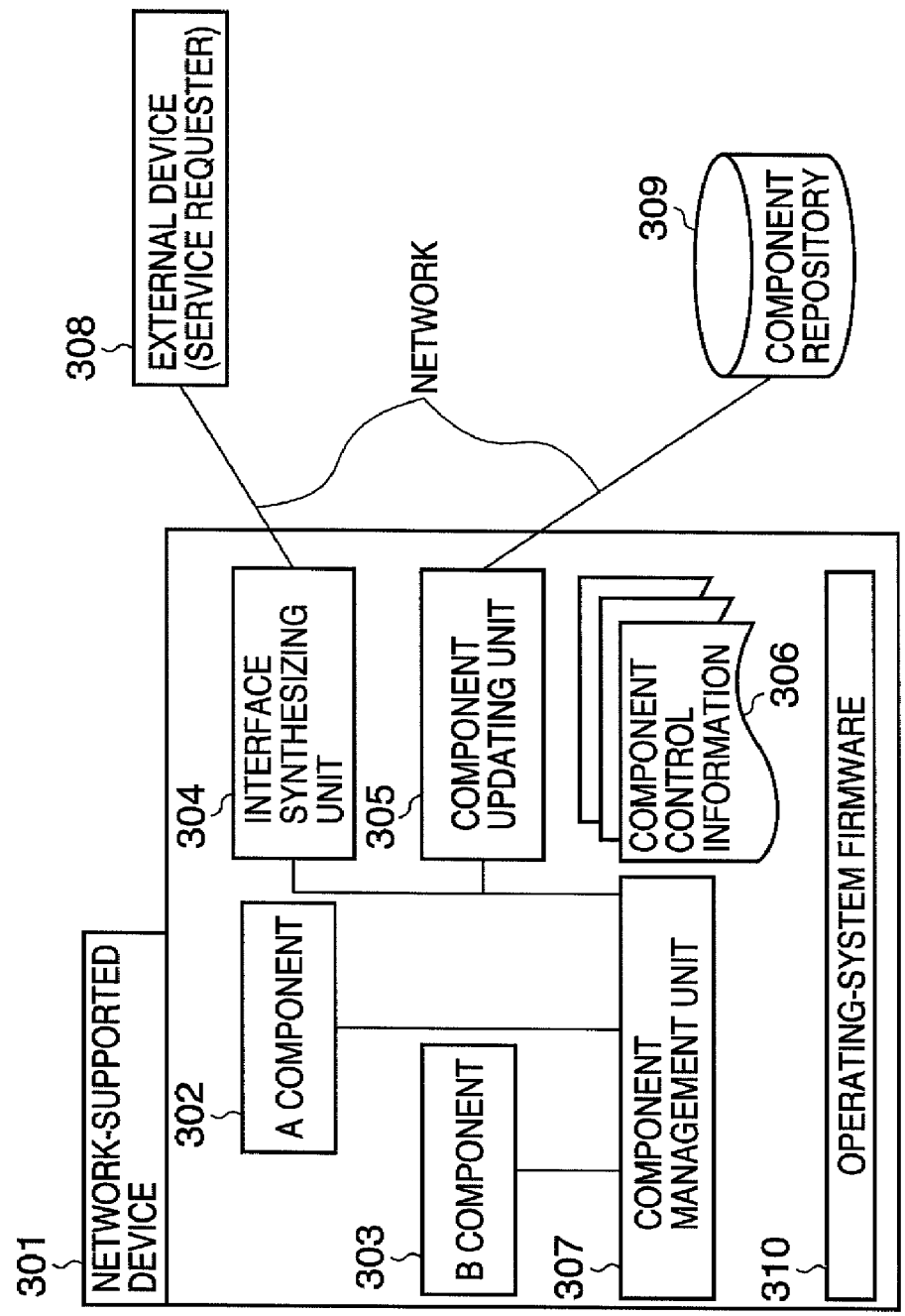
FIG. 1 is a diagram illustrating an example of processes (functions) of a network-supported device.

FIG. 1 is a diagram illustrating an example of processes (functions) of a network-supported device. It should be noted that the arrangement shown in FIG. 1 has been simplified in order to describe an overview of processing according to this embodiment. The details of the structure of a network-supported device equipped with the software of this embodiment will be described from FIG. 2 onward taking a digital camera (digital camera device) as an example.

A network-supported device 301 is a device equipped with the software (or functions) of this embodiment and has a communication function furnished via a network. The device is equipped with operating-system firmware 310, which affords basic processing, as the software constituting the device. Blocks 302 to 307, described later, are arranged above the operating-system firmware 310. Main software constituting internal functions of the network-supported device 301 is managed in units of component software (components). The details of the component software will be described later with reference to FIG. 2.

A component management unit 307 manages the component software and executes processing such as loading and unloading of component software to and from memory and execution of the component software. FIG. 1 illustrates a state in which two components, namely an A component 302 and a B component 303, are being managed by the component management unit 307. However, the number of items of component software to be managed may be only one or more than two.

Further, the component management unit 307 controls the execution of each item of component software using component control information 306. The component control information 306 will be described later with reference to FIG. 3.

A component updating unit 305 acquires a component, which is to be managed in the component management unit 307, from an external component repository 309 and registers the component in the component management unit 307. The component updating unit 305 queries the component repository 309 based upon information concerning a component group held by the component management unit 307, and registers a component, which is sent back by the component repository 309, in the component management unit 307. This makes it possible to add a new component to the network-supported device 301 dynamically and to update the content of existing component software. By way of example, the component repository 309 is provided in a server (server memory) that is capable of communicating with the network-supported device 301. As illustrated in FIG. 1, the server provided with the component repository 309 and the network-supported device 301 are connected via a network.

An interface integrating unit 304 discloses the interfaces of the entire network-supported device 301 in a form that reflects the functions of the installed component software. On the basis of each item of interface information of the component software (components) held by the component management unit 307, the interface integrating unit 304 dynamically generates and discloses the interface information of the entire network-supported device. The interface information of the entirety of the network-supported device 301 disclosed by the interface integrating unit 304 is information that reflects the interface provided by the A component 302 and the interface provided by the B component 303, by way of example.

The interface integrating unit 304 integrates particularly using interface information of component software, which provides an externally disclosable function in the network, among the component software being managed by the component management unit 307. Accordingly, by way of example, although the function provided by the A component 302 in FIG. 1 is a function capable of being externally disclosed in the network, assume that the function provided by the B component 303 is a function used entirely internally. In such case the interface information of the B component 303 is not reflected in interface information integrated and issued (or disclosed) by the interface integrating unit 304. Thus, the interface information of the overall network-supported device 301 generated in the interface integrating unit 304 becomes utilizable from an external device (another device) 308. How interface information is integrated in the interface integrating unit 304 will be described later with reference to FIG. 5. It should be noted the external device 308 is, e.g., a computer, etc. The network-supported device 301 and external device 308 are connected via the network, as illustrated in FIG. 1.

Figure 2:
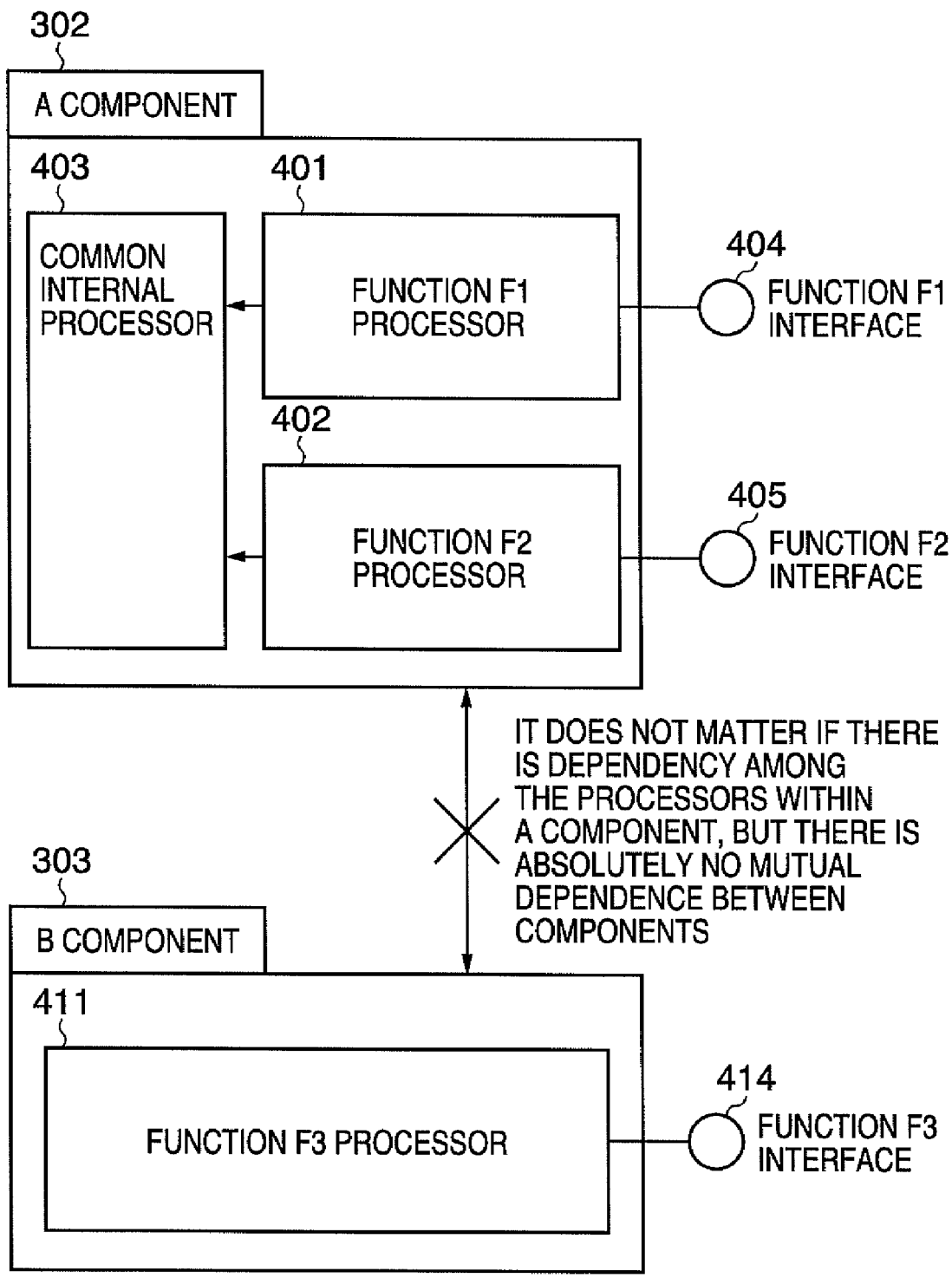
FIG. 2 is a diagram illustrating an example of component software.

FIG. 2 is a diagram illustrating an example of component software (component). Component software refers to a collection of software capable of providing several functions independently. FIG. 2 illustrates in greater detail the A component 302 and B component 303 of FIG. 1.

The A component 302 provides a function F1 and a function F2. Each function can be called from outside the component by the respective interface. The A component 302 is so adapted that the function F1 is called from outside the component software through an interface (function F1 interface) 404. Further, it is so arranged that the function F2 is called from outside the component software through an interface (function F2 interface) 405.

Included within the A component 302 are a processor (function F1 processor) 401 for processing the function F1, and a processor (function F2 processor) 402 for processing the function F2. Also included within the A component 302 is a common internal processor 403 for supplying an internal function used in common from both processors.

Unlike the A component 302, the B component 303 provides only a single function, namely function F3. Accordingly, the B component 303 includes only one internal processor, namely a function F3 processor 411.

Thus, the function that the component software disclosed in the function interface may be a single function, as in the B component 303, or a plurality of functions, as in the A component 302.

The component software of this embodiment is such that a function disclosed externally of the component software is always capable of being called solely by the interface. In other words, the component software of this embodiment discloses, as interface information (or an interface), a mechanism whereby a request relating to the provided function is accepted from outside the component software.

The function F1 processor 401, function F2 processor 402 and common internal processor 403 exist in a form concealed from the exterior where use is made of the function of the A component 302. In other words, in actuality the existence of the processors 401, 402 and 403 is not discernable from other component software (i.e., from the outside) that uses the function F1 interface 404. Conversely, separate component software cannot directly call and use the processors 401, 402 and 403. The same holds true for the B component 303 as well. The functions of the component software must always be used through a function interface. As a result, the items of component software do not exist independently in this embodiment.

Further, in this embodiment, the ability to call an interface for utilizing the functions of the software is limited to the component management unit 307. The items of component software are not allowed to directly call each other's internal processes. Further, a function interface that is a disclosed interface is not allowed to be called directly without the intervention of the component management unit 307. All component software can be executed only by control from the component management unit 307.

Furthermore, although it does not matter if there is dependence between processors within a component (e.g., function F1 processor 401 and function F2 processor 402 within A component 302), there is no mutual dependence between components (e.g., A component 302 and B component 303).

On the basis of the content described in the component control information 306, the component management unit 307 executes function interfaces supplied sequentially by each of the components.

Figure 3:
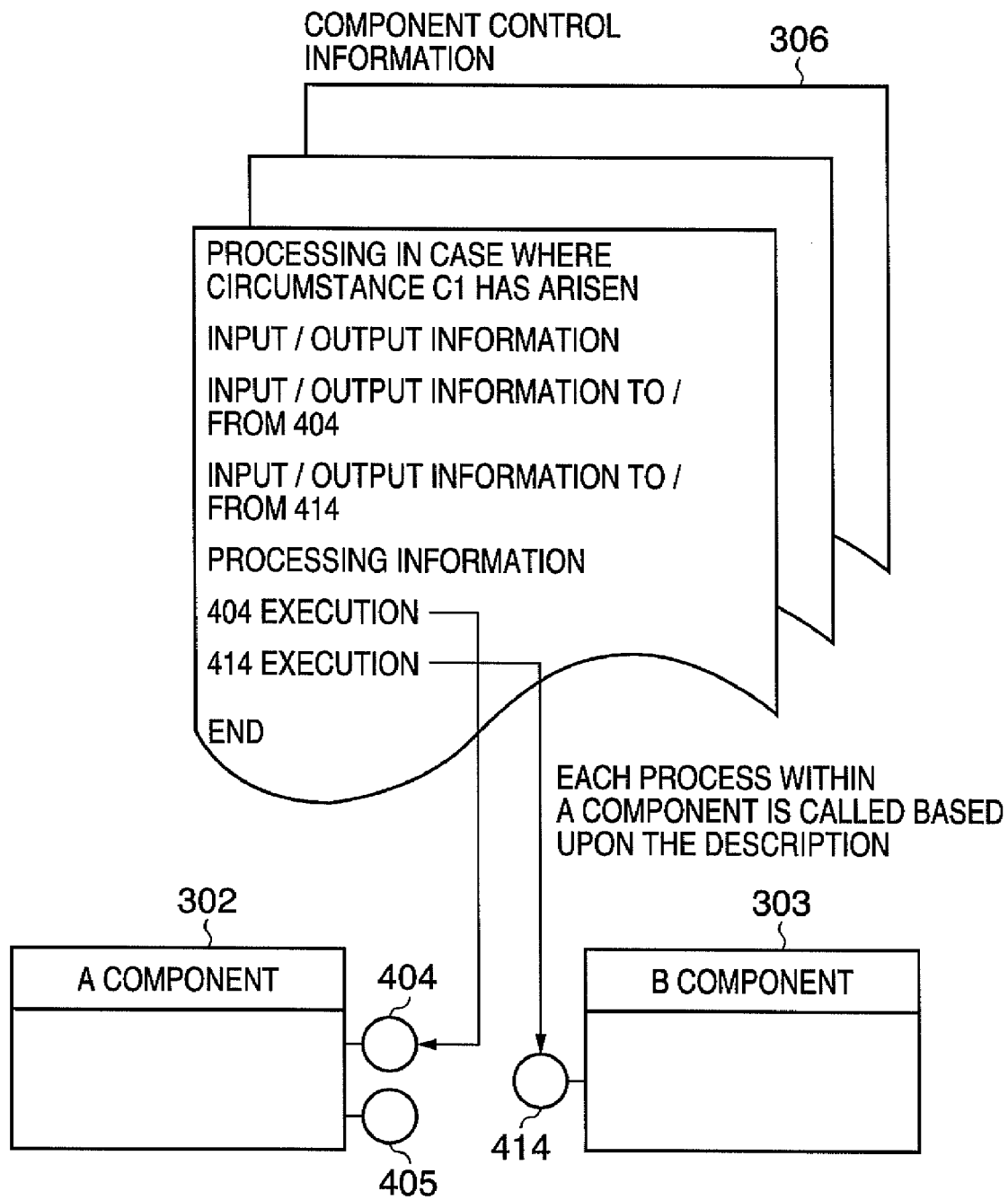
FIG. 3 is a diagram illustrating an example of a relationship between component control information and component software.

FIG. 3 is a diagram illustrating an example of a relationship between component control information and component software (component). The component control information 306 is information managed in the component management unit 307 as information for controlling execution of actual component software. The component control information 306 describes a circumstance faced by a device and processing executed when this circumstance arises. The information is held in the component management unit 307 on a per-circumstance basis in a number equivalent to the number of circumstances dealt with by the device.

Here the term "circumstance" indicates a series of states, which are recognizable by software, generated when some action is imposed on the software with which the network-supported device 301 is equipped. Examples of circumstances in this embodiment are introduction or cut-off of power to the network-supported device 301, an operation from the user (an external operation), a processing request from a network (e.g., the external device 308) and a change in state within the device, etc.

In FIG. 3, the description of the component control information 306 in a case where the network-supported device 301 faces a circumstance C1 is extracted and exemplified. In a case where the occurrence of the circumstance C1 has been detected by the network-supported device 301, the component management unit 307 executes each component under the management of the component management unit 307 based upon the description illustrated in FIG. 3. In FIG. 3, execution of the function F1 interface 404 and execution of a function F3 interface 414 has been specified as processing information in circumstance C1. Accordingly, in a case where circumstance C1 has occurred in network-supported device 301, first the function F1 interface 404 in A component 302 is executed by the component management unit 307. Next, the function F3 interface 414 in the B component 303 is executed by the component management unit 307.

Information, namely input and output information of the function F1 interface 404 and input and output information of the function F3 interface 414, is described in input/output information of processing, which is executed in a case where circumstance C1 has occurred, in the component control information 306. The input information of the function F1 interface 404 mentioned here is information specified as an input value to the function F1 interface 404. The output information of the function F1 interface 404 is information that the function F1 interface 404 outputs as the result of processing. Further, the input information of the function F3 interface 414 is information specified as an input value to the function F3 interface 414. The output information of the function F3 interface 414 is information that the function F3 interface 414 outputs as the result of processing.

Information exchanged between the A component 302 and B component 303, which are executed in the case of circumstance C1, and the component management unit 307 is managed in its entirety by the component management unit 307 based upon the component control information 306.

Thus, processing within the A component 302 (function F1 processing in the example of FIG. 3) and processing within the B component 303 (function F3 processing) is called via the function F1 interface 404 and function F3 interface 414 based upon the description of the component control information 306.

Figure 4:
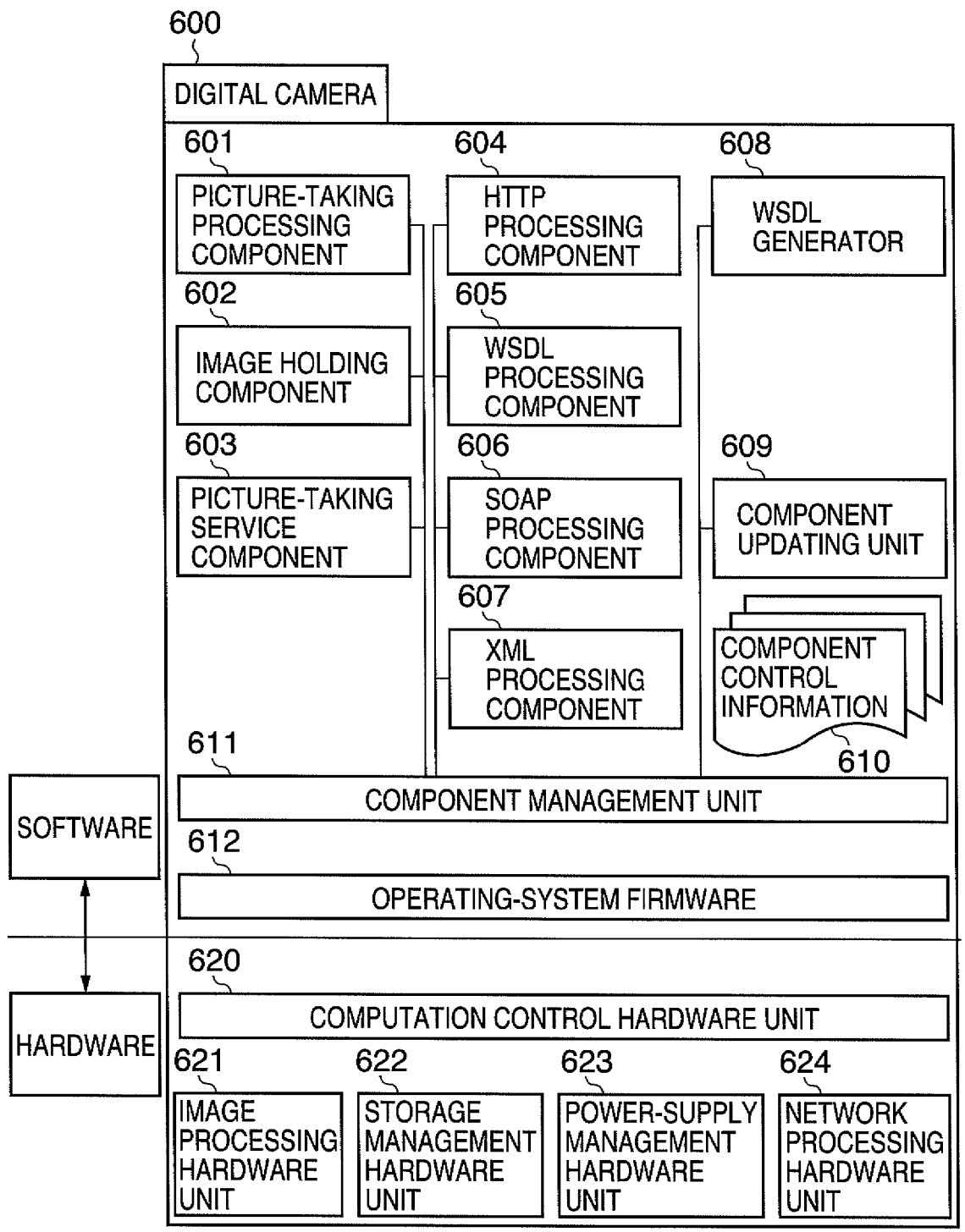
FIG. 4 is a diagram illustrating an example of internal configuration in a case where a network-supported device 301 is a digital camera.

FIG. 4 is a diagram illustrating an example of internal configuration in a case where the network-supported device 301 is a digital camera 600. By using a Web service technique with the digital camera 600, processing such as photography and image acquisition, etc., which are functions of the digital camera 600, is capable of being controlled via the network.

In FIG. 4, blocks 621 to 624 indicate hardware with which the digital camera 600 is equipped. A computation control hardware unit 620 mainly administers computation storage control relating to device control. The computation control hardware unit 620 causes implementation (functioning) of an upper software group (601 to 612) by executing a program that has been stored on a hard disk (or in a ROM) of a storage management hardware unit 622. It should be noted that component control information 610, etc. has been set (or defined) in advance and stored in a RAM, hard disk or ROM, etc. of the storage management hardware unit 622.

An image processing hardware unit 621 refers generically to hardware for implementing imaging processing that includes optical processing by a lens or CCD sensor, etc. in the digital camera 600, and implements the digital processing of video. The storage management hardware unit 622 holds an image captured and processed by the image processing hardware unit 621, etc. The storage management hardware unit 622 refers generically to hardware for driving a non-volatile RAM or hard disk, etc. A power-supply management hardware unit 623 refers generically to a device for supplying power to all hardware units. This unit controls a chargeable battery or externally input power supply. A network processing hardware unit 624 provides means by which the digital camera 600 communicates (by wire or wirelessly) with the outside (e.g., with the external device 308) via the network. Although the details are omitted in order to simplify the description, the arrangement of FIG. 4 further includes a bus hardware unit interconnecting the hardware units, and a main-memory hardware unit for storing the results of computations by the computation control hardware unit 620.

Blocks 601 to 612 in FIG. 4 indicate software (or information) with which the digital camera 600 is equipped. Basically, FIG. 4 illustrates the structure of the network-supported device 301 of FIG. 1, described above, in more concrete form. Portions not influenced by a difference ascribed to the type of device correspond to the respective portions in FIG. 1.

Operating-system firmware 612 corresponds to the operating-system firmware 310 in FIG. 1. The operating-system firmware 612 provides means for controlling each of the hardware units indicated by 621 to 624. A component management unit 611 for executing control of each item of component software above the operating-system firmware 612 similarly corresponds to the component management unit 307 in FIG. 1. Further, component control information 610 corresponds to the component control information 306 in FIG. 1, and a component updating unit 609 corresponds to the component updating unit 305 in FIG. 1.

Each processor is such that a selection of installation changes depending upon the type or manufacturing cost of the device of interest or the requested performance. For example, in the case of the digital camera shown in FIG. 4, the operating-system firmware 612 is such that there are many cases where installation of an RTOS (Real-Time Operating System) is selected. However, in a case where the type of device of interest is office equipment such as a copier, there are cases where the operating-system firmware 612 is such that a pre-installed edition of a general operating system having a higher capability is employed.

Furthermore, blocks 601 to 608 are software processors necessary because the digital camera 600 is a digital camera controllable by a Web service.

A picture-taking processing component 601 executes picture-taking processing, which is a basic function of the digital camera 600. More specifically, the picture-taking processing component 601 implements picture-taking processing by controlling the image processing hardware unit 621.

An image holding component 602 holds the images acquired by the picture-taking processing component 601. More specifically, the image holding component 602 implements image storage by controlling the storage management hardware unit 622.

These processors are provided in order that a function provided by each hardware unit may be controlled from the software. However, since the digital camera 600 has a function that makes possible control via the network, a software processor for executing network processing is also necessary.

A picture-taking service component 603 provides a function for disclosing the function of the picture-taking processing component 601 and the function of the image holding component 602 over the network as services.

An HTTP processing component 604 provides a function for sending and receiving information based upon the HTTP protocol. A WSDL processing component 605 processes WSDL in order to describe interface information for disclosing the functions of the digital camera 600 by a Web service.

A SOAP processing component 606 is a processor for interpreting an XML message sent and received based upon the SOAP specifications. An XML processing component 607 analyzes information described in XML and executes processing for converting the information to a form processable by each software processor or for converting information processed by each software processor to the XML format.

The SOAP processing component 606 is a processor for interpreting an XML message sent and received based upon the SOAP specifications. The XML processing component 607 analyzes information described in XML and executes processing for converting the information to a form processable by each software processor or for converting information processed by each software processor to the XML format.

In a case where a certain SOAP message has been received by the digital camera 600, the HTTP processing component 604 first accepts the SOAP message as HTTP and the XML processing component 607 analyzes the message. The result of analysis by the XML processing component 607 is then processed by the SOAP processing component 606. This processing will be described later in greater detail with reference to FIG. 5.

The software processors 601 to 607 correspond to the A component 302 or B component 303 in FIG. 1. That is, these are processors that become the object of loading and unloading to and from memory and of execution in the component management unit 307 of FIG. 1 (the component management unit 611 of FIG. 4). Further, the specific processing procedure of these processors has been defined by the component control information 306 (the component control information 610 of FIG. 4), as illustrated in FIG. 3.

A WSDL generator 608 corresponds to the interface integrating unit 304 in FIG. 1. Since the digital camera 600 is a device that uses a Web service, interface information is disclosed in line with the WSDL specifications.

Figure 5A:
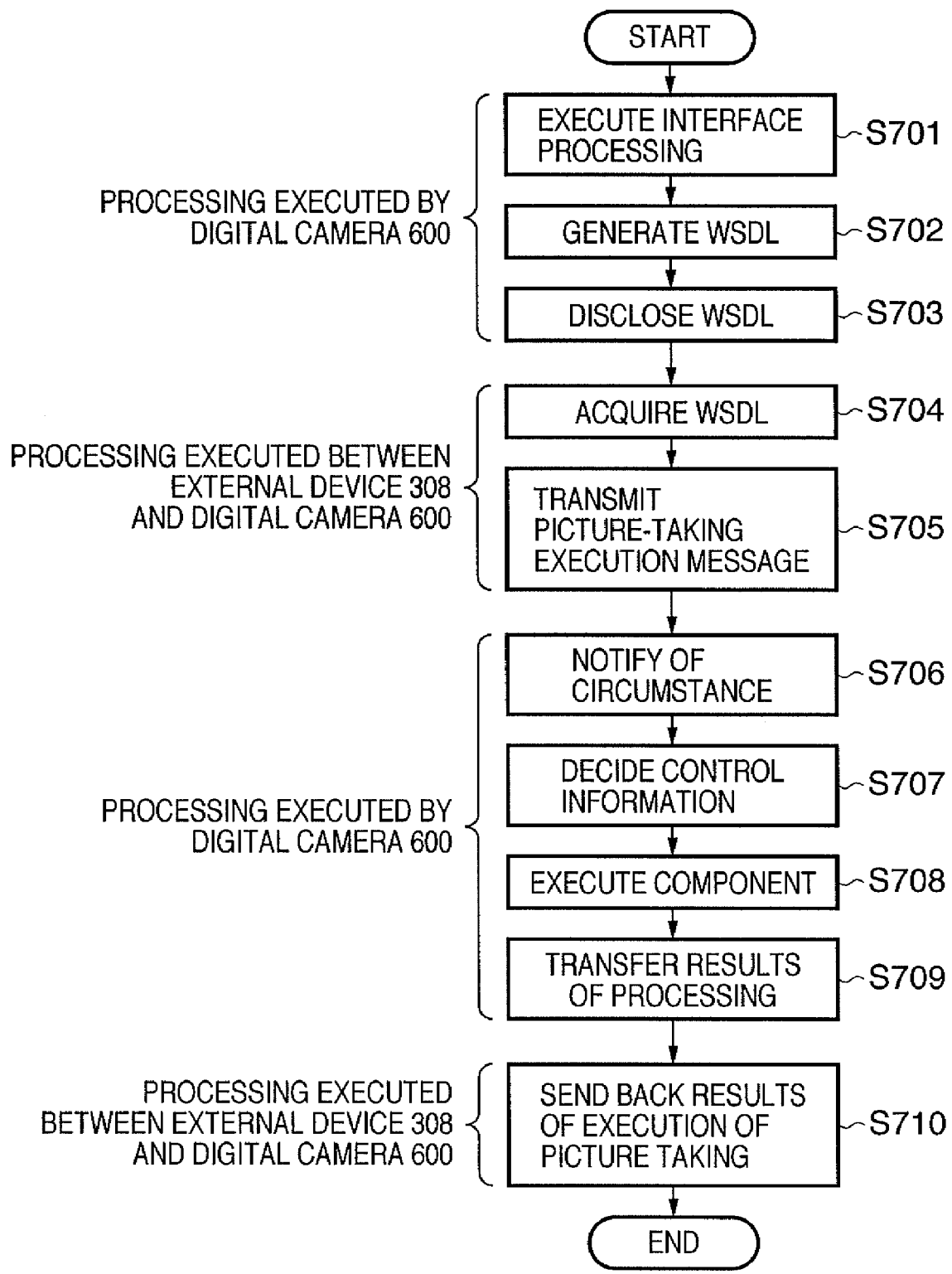
FIG. 5A is a diagram illustrating a flowchart of internal processing generated when a digital camera 600 executes photography upon receiving a message, which is in compliance with Web service, from a network.
Figure 5B:
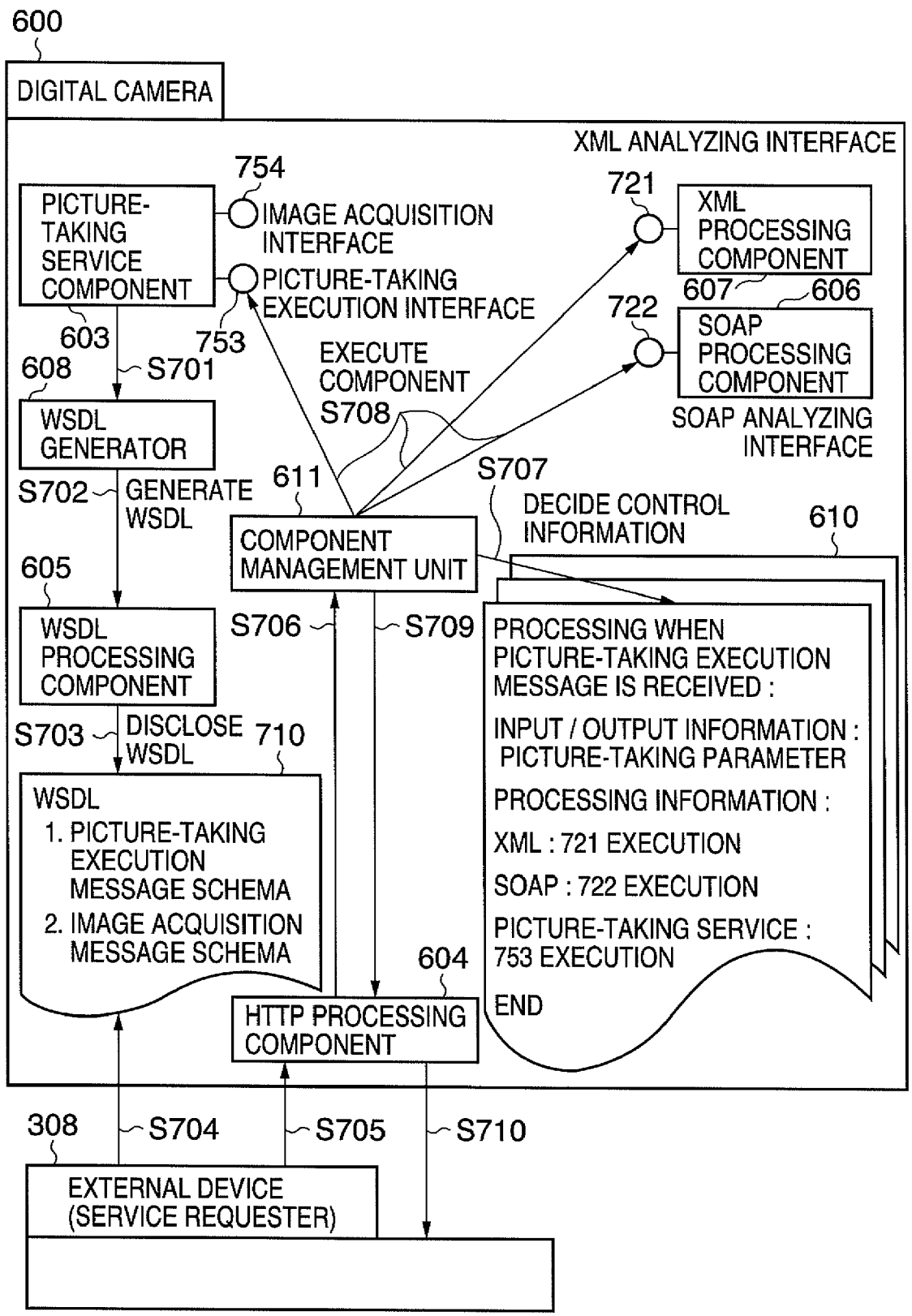
FIG. 5B is a diagram illustrating which processor within digital camera 600 has executed each process generated when digital camera 600 executes photography upon receiving a message, which is in compliance with Web service, from a network.

FIGS. 5A and 5B illustrate processing implemented by each item of software in relating to internal processing generated when the digital camera 600 executes photography upon receiving a message, which is in compliance with the Web Service, from the network. FIG. 5A is a diagram illustrating a processing flowchart, and FIG. 5B is a diagram illustrating which processor within the digital camera 600 has executed each process.

At step S701, the component management unit 611 executes interface processing for processing interface information of each item of component software with which the digital camera 600 is equipped. More specifically, the component management unit 611 obtains all interface information of each of the components with which the digital camera 600 is equipped and selects from this information only that which is capable of being disclosed external to the device. Here each component refers to each of the components 601, 602, 603, 604, 605, 606 and 607. The interface information is being held by the component management unit 611. The interface information of each component includes information indicating whether its own service is capable of being disclosed to the outside.

In this embodiment, component software that provides a disclosable service is only the picture-taking service component 603. The component management unit 611 therefore obtains only interface information of an image acquisition interface 754 and picture-taking execution interface 753 possessed by the picture-taking service component 603. The processing at step S701 is executed before the digital camera 600 starts executing processing to disclose functions to the outside. It should be noted that this processing typically is executed when power has been introduced to the digital camera 600 and when the network connection status with respect to the digital camera 600 has changed.

At step S702, the WSDL generator 608 executes processing for generating WSDL, which becomes the interface of the overall digital camera 600, based upon the interface information obtained at step S701. More specifically, the WSDL generator 608 converts the interface information of the image acquisition interface 754 and picture-taking execution interface 753 to information (WSDL information) that is in line with the specifications of WSDL. The WSDL information is information that includes message schema information describing information necessary in order to call the image acquisition interface 754 and picture-taking execution interface 753, as illustrated by WSDL (WSDL information) 710 in FIG. 5B.

Next, at step S703, the WSDL thus created is disclosed. The disclosure is executed by the WSDL processing component 605. As a result, a state is attained in which WSDL information in which how the functions of the digital camera 600 can be used can be acquired from outside the digital camera 600 (e.g., from the external device 308) via the network.

At step S704, the external device 308 acquires the WSDL information, which has been disclosed at step S703, from the digital camera 600. By way of example, the external device 308 is a computer, as mentioned above. It should be noted that HTTP is used in acquisition of the WSDL information. The external device 308 that has acquired the WSDL information can ascertain how a message that is capable of calling the functions of the digital camera 600 should be generated from this point onward.

At step S705, the external device 308 transmits a message (picture-taking execution message) for executing photography to the digital camera 600. The HTTP processing component 604 of the digital camera 600 receives the picture-taking execution message.

At step S706, the HTTP processing component 604, upon receiving the picture-taking execution message, notifies the component management unit 611 of occurrence of the circumstance "arrival of picture-taking execution message from outside".

At step S707, the component management unit 611 receives this notification and acquires (or decides) control information applicable to (compatible with) this circumstance from the component control information 610. As illustrated in FIG. 5B, the component management unit 611 obtains the following control information, by way of example: "Execute XML analyzing interface 721 of XML processing component 607, SOAP analyzing interface 722 of SOAP processing component 606 and picture-taking execution interface 753 of picture-taking service component 603."

At step S708, the component management unit 611 sequentially calls each of the specified interfaces in each of the components based upon the control information acquired (or decided) at step S707. The component management unit 611 accumulates the results of execution by the component processors based upon the control information obtained earlier.

Owing to calling of the XML analyzing interface 721 of XML processing component 607, the XML processing component 607 analyzes, as XML information, the picture-taking execution message transmitted from the external device 308 at step S705. Next, owing to calling of the SOAP analyzing interface 722 of SOAP processing component 606, the SOAP processing component 606 regards the content of the XML as being in line with the specifications of SOAP and interprets this as a picture-taking parameter. Finally, owing to calling of the picture-taking execution interface 753 of picture-taking service component 603, the picture-taking service component 603 executes photography (picture-taking processing) based upon the picture-taking parameter.

Although not illustrated in FIGS. 5A and 5B, a processing request is issued internally from the picture-taking service component 603 to the picture-taking processing component 601, and thenceforth the image processing hardware unit 621 is driven via the operating-system firmware 612.

At step S709, the component management unit 611 transfers the results of processing to the HTTP processing component 604. Next, at step S710, the HTTP processing component 604 sends back (transmits) information serving as the result of execution of picture-taking processing to the external device 308.

Thus, the digital camera 600 discloses to the external device 308 the picture-taking execution interface, which is the camera's own function. The external device 308 causes the digital camera 600 to perform photography by using the disclosed picture-taking execution interface.

Figure 6A:
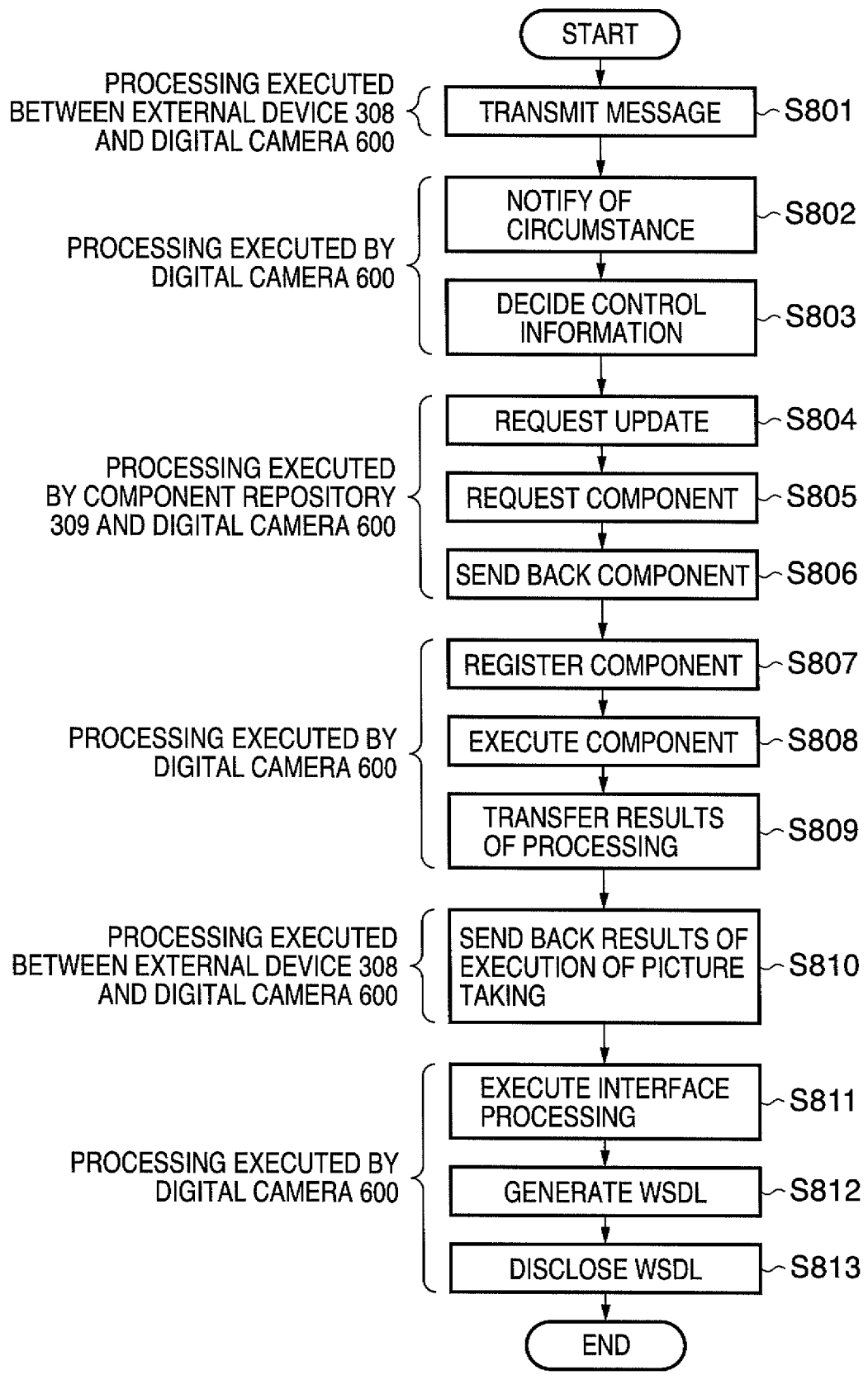
FIG. 6A is a diagram illustrating a flowchart of internal processing generated when digital camera 600 executes image compression upon receiving a message, which is in compliance with Web service, from a network.
Figure 6B:
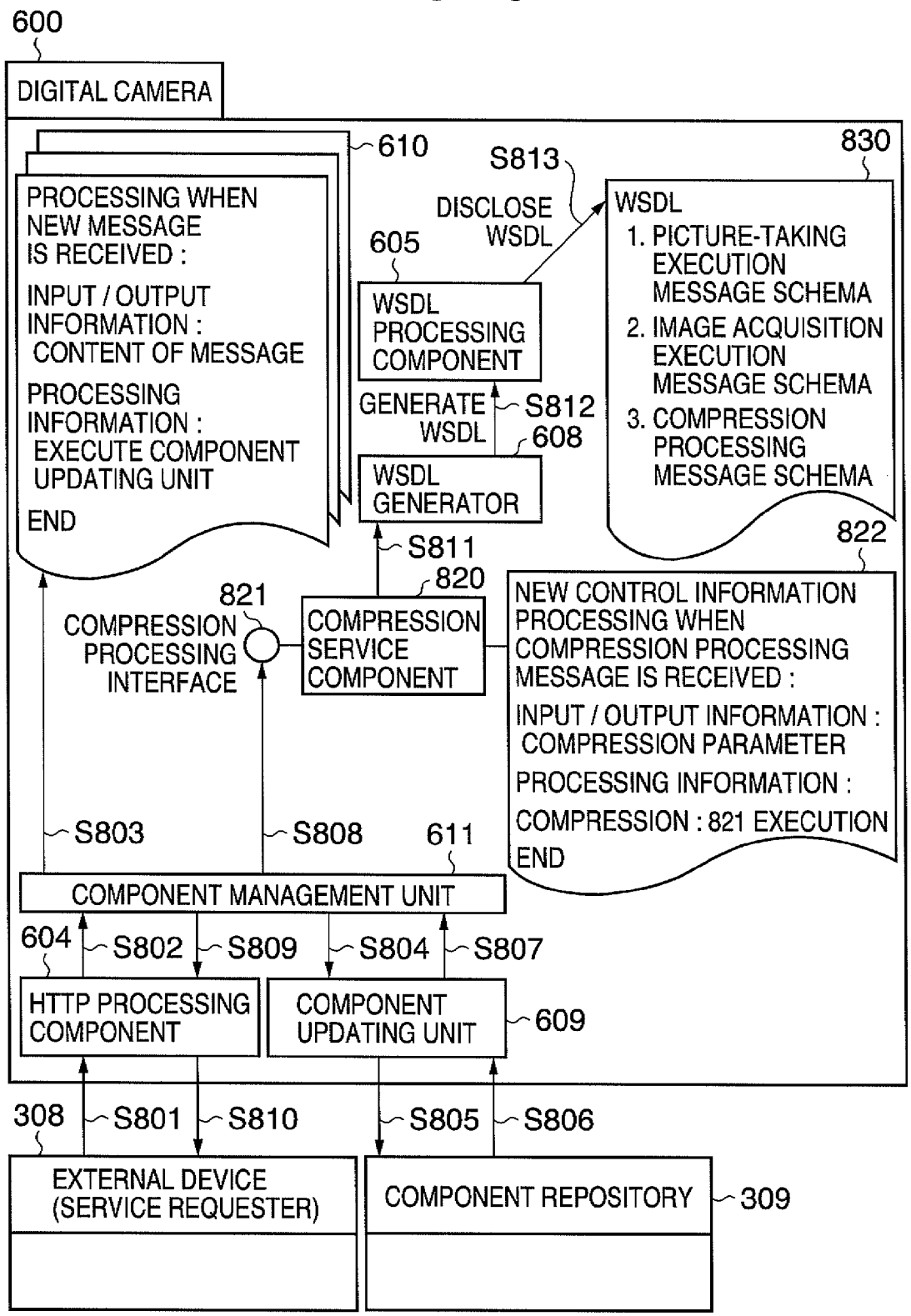
FIG. 6B is a diagram illustrating which processor within digital camera 600 has executed each process generated when digital camera 600 executes image compression upon receiving a message, which is in compliance with Web service, from a network.

FIGS. 6A and 6B illustrate processing implemented by each item of software in relating to internal processing generated when the digital camera 600 executes image compression upon receiving a message, which is in compliance with the Web Service, from the network. Unlike the processing of FIGS. 5A and 5B for executing picture taking, here it is assumed that component software having an image compression function does not exist in the digital camera 600 at this stage. FIG. 6A is a diagram illustrating a processing flowchart, and FIG. 6B is a diagram illustrating which processor within the digital camera 600 has executed each process.

At step S801, the external device 308 issues (transmits) a message requesting image compression processing to the digital camera 600. It is assumed that at this stage the digital camera 600 is not equipped with component software having a function for image compression processing, as illustrated in FIG. 4. Accordingly, WSDL disclosed by the digital camera 600 is the WSDL 710 shown in FIG. 5B and an image-compression message schema information does not exist. This means that the WSDL acquisition processing of step S704 in FIG. 5A does not exist in FIGS. 6A and 6B. The message requesting image compression processing is received by the HTTP processing component 604 in the digital camera 600 in a manner similar to FIGS. 5A and 5B.

At step S802, the HTTP processing component 604, upon receiving the message requesting image compression processing, notifies the component management unit 611 of occurrence of the circumstance "arrival of message requesting image compression processing from outside".

At step S803, the component management unit 611 receives this notification and acquires (or decides) control information applicable to (compatible with) this circumstance from the component control information 610. At this time the component management unit 611 detects that the information is message schema information that has not been defined in the interface information that it itself has disclosed and determines that a circumstance "arrival of new message from outside" has occurred. The component management unit 611 acquires (or decides) control information applicable to this circumstance from the component control information 610. As a result, the component management unit 611 obtains "execute component updating unit" as the description of processing applicable to this circumstance, as illustrated 6B.

At step S804, the component management unit 611 requests the component updating unit 609 to update component software relating to image compression processing based upon the description of the processing.

At step S805, the component updating unit 609, which has received this request, issues a request for component software relating to image compression processing to the component repository 309 that exists on the network. The component repository 309 is provided in, e.g., a server, as mentioned above. On the basis of the issued request (request information) for component software relating to image compression processing, the component repository 309 searches for component software stored internally and control information corresponding to the component software.

At step S806, the component repository 309 sends the component software relating to the image compression processing and the control information back to the component updating unit 609. It is assumed that a compression service component 820 and new control information 822, which is control information for controlling the compression service component 820, shown in FIG. 6B are sent back at step S806.

At step S807, the component updating unit 609 registers the received compression service component 820 and new control information 822 in the component management unit 611. By virtue of this is registration, a state in which the compression service component 820 is usable is attained.

At step S808, the component management unit 611 refers to the newly registered new control information 822. In accordance with the new control information 822, execution of a compression processing interface 821 of the compression service component 820 is specified. Accordingly, the component management unit 611 calls the compression processing interface 821 based upon the new control information 822 thus obtained. The compression service component 820 executes image compression processing, which is the specified processing, and sends the results of processing back to the component management unit 611. On the basis of the new control information 822, the component management unit 611 accumulates the results of execution by the compression service component 820.

Further, at step S809, the component management unit 611 transfers the results of image compression processing to the HTTP processing component 604. Then, at step S810, the HTTP processing component 604 sends back the results of image compression processing to the external device 308.

At step S811, the component management unit 611 applies interface processing to the compression service component 820 registered at step S807. This processing is the same as the processing of step S701 in FIG. 5A.

At step S812, the WSDL generator 608 executes processing for generating WSDL based upon the interface information obtained at step S811. This processing is the same as that of step S702 in FIG. 5A. That is, on the basis of the interface information obtained at step S811, the WSDL generator 608 executes WSDL generation for generating WSDL that becomes the interface of the overall digital camera 600.

More specifically, the WSDL generator 608 converts the interface information of the image acquisition interface 754, picture-taking execution interface 753 and compression processing interface 821 to information that is in line with the WSDL specifications. This WSDL is information that includes message schema information describing information necessary in order to call a total of three interfaces. That is, in comparison with the WSDL 710 of FIG. 5B, this becomes information to which "3. COMPRESSION PROCESSING MESSAGE SCHEMA" has been added.

At step S813, the WSDL created is disclosed. The disclosure is executed by the WSDL processing component 605. This processing is the same as that of step S703 in FIG. 5A. As a result, a state is attained in which WSDL information in which how the functions of the digital camera 600 can be used can be acquired from outside the digital camera 600 via the network.

Figure 6C:
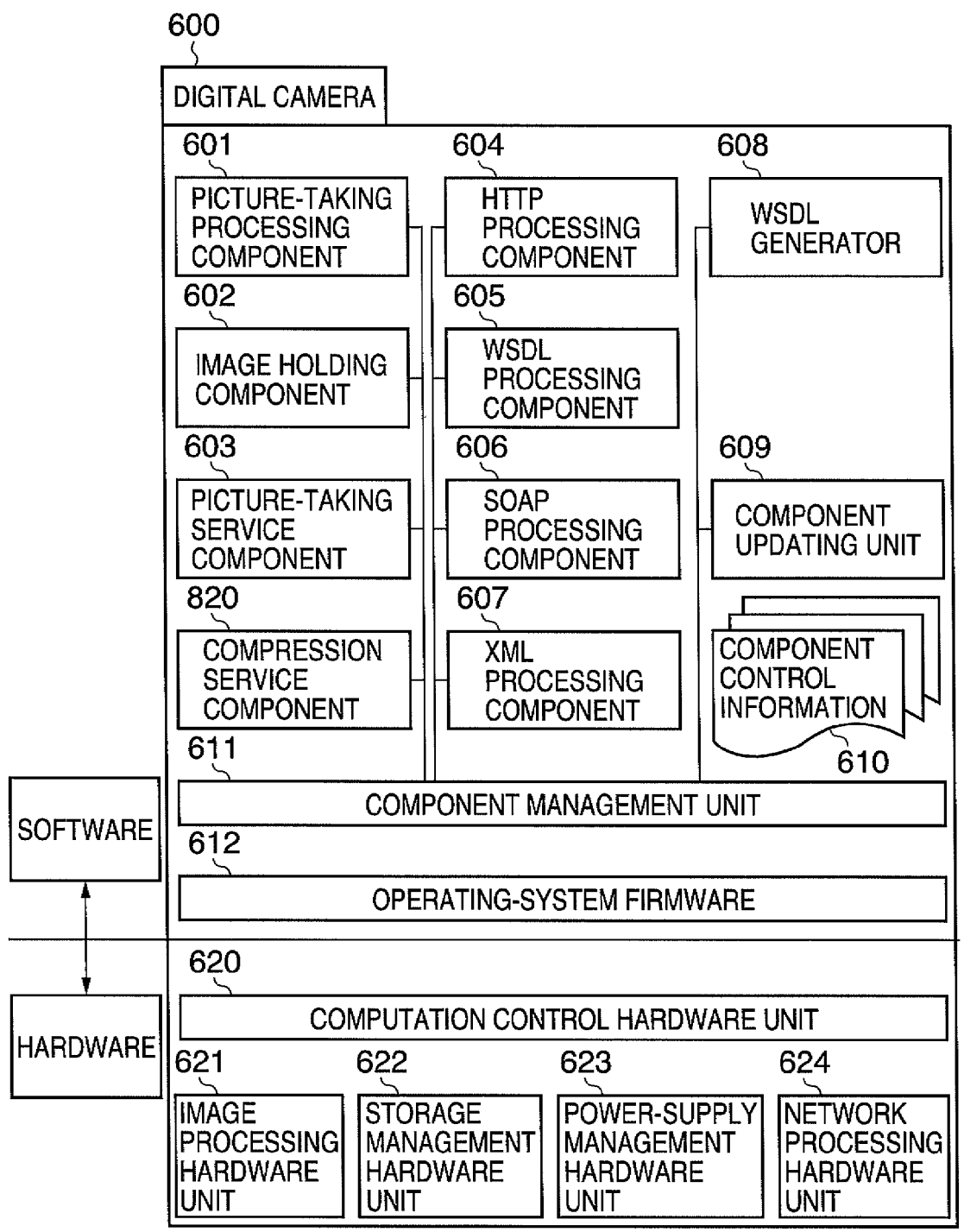
FIG. 6C is a diagram illustrating an example of updated internal configuration of digital camera 600.

Thus, in response to the message from the network requesting image compression processing that is in line with the Web service, the digital camera 600 acquires the corresponding component dynamically from the outside and executes the component, thereby executing the requested processing. Further, the digital camera 600 updates its own interface information based upon the functions provided by the component (new component) acquired from the outside. FIG. 6C is a diagram illustrating an example of updated internal configuration of the digital camera 600. The compression service component 820 that was not present in the stage shown in FIG. 4 has been added on in FIG. 6C as a component to be managed by the component management unit 611.

Thus, the digital camera 600 efficiently executes software necessary for communication processing and is capable of adaptively executing the software used even in circumstances where the interface information of the service is changed at will. That is, the digital camera 600 has a message schema processing function that is capable of flexibly supporting individual items of interface information that change from time to time. On the basis of interface information of component software that constitutes the interior of the digital camera 600, the digital camera 600 is capable of automatically generating interface information of services (or functions) of the overall digital camera 600. This makes it possible to update the interface information of services processable by the camera itself. However, that the device have a function for thus automatically acquiring a component from the external component repository 309 is not necessarily essential as far as the present invention is concerned.

The prior art is such that when a device is networked, interface information of a corresponding service is decided beforehand at the time of design and development, and what message schema processing will be executed must be decided in advance. However, with the digital camera 600, a change can be made even when the camera is on the market after design and development. As a result, the digital camera 600 is capable of flexibly dealing with a situation in which message schema processing that includes an unknown format is required.

It should be noted that this embodiment may be applied to a system constituted by a plurality of devices (e.g., a host computer or interface device) or to an apparatus comprising a single device.

In accordance with this embodiment, as described above, it can be so arranged that component software relating to a function provided by a device can be executed adaptively even in circumstances where a device or interface information of a component software is changed at will.

Other Embodiments

Further, the object of the invention is attained by adopting the arrangement described below. Specifically, a recording medium (or storage medium) on which the program codes of the software for implementing the functions of the foregoing embodiment is supplied to a system or apparatus. A computer (CPU or MPU) of the system of apparatus reads out and executes the program codes stored on the recording medium. In this case, the program codes read from the recording medium implement the functions of the embodiment and the recording medium storing the program codes constitutes the invention.

Further, by executing the program codes read out by the computer, an operating system or the like running on the computer executes some or all of the actual processing based upon the indications in the program codes. A case where the functions of the above-described embodiment are implemented by this processing also is covered by the present invention.

Furthermore, program code read from a recording medium is written to a memory provided on a function expansion card inserted into the computer or provided in a function expansion unit connected to the computer. Thereafter, a CPU or the like provided on the function expansion card or function expansion unit performs some or all of actual processing based upon the indication in the program codes, and the functions of the above embodiment are implemented by this processing. Such a case also is covered by the present invention.

In a case where the present invention is applied to the above-mentioned recording medium, programs corresponding to the flowcharts (some or all) described earlier are stored on the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-023255, filed Feb. 1, 2007, which is hereby incorporated by reference herein in its entirety.

What is claimed is:

1. An execution apparatus for executing a function in response to a request received via a network, said apparatus comprising:
   a managing unit adapted to manage a first component that provides a first function;
   an obtaining unit adapted to obtain first interface information representing an first interface via which the managed first component that provides a function accepts a the request via the network;
   a generation unit adapted to generate an first interface of the execution apparatus for accepting, a via the network, the request of the first function provided by the first component via a network, based upon the first interface information of the first component, wherein the generated first interface defines input data for the first function and output data for the first function, and the generated first interface is published to the network; and
   a registering unit adapted to register a second component that provides a second function such that the registered second component is managed by the managing unit, wherein the generation unit generates a second interface of the execution apparatus for accepting via the network the request for the first function provided by the first component and a request for the second function provided by the second component, based upon the first interface information of the first component and second interface information that represents a second interface via which the registered second component accepts the request via the network, wherein the generated second interface defines the input data for the first function, the output data for the first function, input data for the second function and output data for the second function, and the generated second interface is published to the network.

2. The apparatus according to claim 1, wherein said obtaining unit has a holding unit adapted to hold the first component that provides the first function and control information of the first component, and said obtaining unit obtains the first interface information of the first component being held by said holding unit.

3. The apparatus according to claim 2, wherein said obtaining unit has a requesting unit adapted to request the first interface of the first component to execute the first function requested via the network, the request being made based upon the control information being held by said holding unit.

4. The apparatus according to claim 1, wherein said obtaining unit accepts a request to register the second component, and said generation unit, based upon the second interface information of the registered second component, updates the first interface to the second interface via which the execution apparatus accepts a the request via the network.

5. The apparatus according to claim 1, wherein said registering unit has an acquisition unit adapted to acquire the second component, which is for executing the requested function, via the network in response to a request for the second function, which is other than the first functions provided by the first component for which the first interface information has been obtained by said obtaining unit.

6. A method of accepting a request received via a network by an execution apparatus which manages a first component that provides a first function, comprising the steps of:
   obtaining first interface information representing a first interface via which the managed first component that provides a function accepts the request via the network;
   generating the first interface of the execution apparatus for accepting via the network the request for the first function provided by the first component based upon the obtained first interface information of the first component, wherein the generated first interface defines input data for the first function and output data for the first function;
   publishing the generated first interface to the network;
   registering a second component that provides a second function such that the registered second component is managed by the execution apparatus; and
   generating a second interface of the execution apparatus for accepting via the network the request for the first function provided by the first component and a request for the second function provided by the second component, based upon the first interface information of the first component and second interface information representing a second interface via which the registered second component accepts the request via the network, wherein the generated second interface defines the input data for the first function, the output data for the first function, input data for the second function and output data for the second function, and the generated second interface is published to the network.

7. The method according to claim 6, wherein said obtaining step further comprises a holding step of holding the first component that provides the first function and control information of the first component, and said obtaining step includes obtaining the first interface information of the first component being held.

8. The method according to claim 7, wherein said obtaining step further comprises a requesting step of requesting the first interface of the first component to execute the first function requested via the network, the request being made based upon the control information being held.

9. The method according to claim 6, wherein said obtaining step includes accepting a request to register the second component, and said generation step includes, based upon the second interface information of the registered second component, updating the first interface to the second interface via which the execution apparatus accepts the request via the network.

10. The method according to claim 6, wherein said registering step further comprises an acquisition step of acquiring the second component, which is for executing the requested function, via the network in response to a request for the second function, which is other than the first function provided by the first components for which the first interface information has been obtained in said obtaining step.

11. A non-transitory, computer-readable storage medium storing a computer program, in executable form, for causing a computer to perform a method of accepting a request received via a network by an execution apparatus which manages a first component that provides a first function, said computer program comprising the steps of:

obtaining first interface information representing a first interface via which the managed first component that provides a function accepts the request via the network;

generating the first interface of the execution apparatus for accepting via the network the request for the first function provided by the first component, based upon the obtained first interface information of the first component, the generated first interface defines input data for the first function and output data for the first function;

publishing the generated first interface to the network;

registering a second component that provides a second function such that the registered second component is managed by the execution apparatus; and generating a second interface of the execution apparatus for accepting via the network the request for the first function provided by the first component and a request for the second function provided by the second component, based upon the first interface information of the first component and a second interface information representing a second interface via which the registered second component accepts the request via the network, wherein the generated second interface defines the input data for the first function, the output data for the first function, input data for the second function and output data for the second function, and the generated second interface is published to the network.

12. The storage medium according to claim 11, wherein said obtaining step further comprises a holding step of holding the first component that provides the first function and control information of the first component, said obtaining step includes obtaining the first interface information of the first component being held, and said obtaining step further comprises a requesting step of requesting the first interface of the first component to execute the first function requested via the network, the request being made based upon the control information being held.

13. The storage medium according to claim 11, wherein said obtaining step includes accepting a request to register the second component, and said generation step includes, based upon the second interface information of the registered second component, updating the first interface to the second interface via which the execution apparatus accepts the request via the network.

14. The storage medium according to claim 11, wherein said registering step further comprises an acquisition step of acquiring the second component, which is for executing the requested function, via the network in response to a request for the second function, which is other than the first functions provided by the first components for which the first interface information has been obtained in said obtaining step.

* * * * *